(12) United States Patent
Alard et al.

(10) Patent No.: US 7,313,174 B2
(45) Date of Patent: Dec. 25, 2007

(54) METHOD FOR EXTRACTING A VARIABLE REFERENCE PATTERN

(75) Inventors: Michel Alard, Paris (FR); Nathalie Goudard, Courbevoie (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 386 days.

(21) Appl. No.: 10/467,571

(22) PCT Filed: Feb. 7, 2002

(86) PCT No.: PCT/FR02/00486

§ 371 (c)(1),
(2), (4) Date: Feb. 3, 2004

(87) PCT Pub. No.: WO02/065685

PCT Pub. Date: Aug. 22, 2002

(65) Prior Publication Data

US 2004/0131110 A1   Jul. 8, 2004

(30) Foreign Application Priority Data

Feb. 8, 2001   (FR) .................................. 01 01751

(51) Int. Cl.
*H04B 1/707* (2006.01)
(52) U.S. Cl. ...................... 375/149; 375/296; 370/203; 370/208; 370/491; 370/500

(58) Field of Classification Search ................ 370/491, 370/500, 343, 203, 208; 375/149, 296
See application file for complete search history.

(56) References Cited

U.S. PATENT DOCUMENTS

| 5,274,629 | A  | * | 12/1993 | Helard et al. ................ 370/208 |
| 6,335,923 | B2 | * | 1/2002 | Kubo et al. ................. 370/335 |
| 6,654,429 | B1 | * | 11/2003 | Li ............................. 375/316 |
| 6,768,713 | B1 | * | 7/2004 | Siala et al. .................. 370/203 |
| 2003/0017835 | A1 | * | 1/2003 | Bergel ......................... 455/502 |

FOREIGN PATENT DOCUMENTS

| EP | 1 030 489 | 8/2000 |
| EP | 1 061 705 | 12/2000 |
| EP | 1 065 855 | 1/2001 |

OTHER PUBLICATIONS

Magnus Sandell (PHD thesis, "Design and Analysis of Estimators for Multicarrier Modulation and Ultrasonic Imaging" Lulea University, Sweden, 1996).*

(Continued)

*Primary Examiner*—Chieh M. Fan
*Assistant Examiner*—Aristocratis Fotakis
(74) *Attorney, Agent, or Firm*—Westman, Champlin & Kelly

(57) ABSTRACT

A method is provided for extracting a sequence of pilot symbols enabling to estimate the transfer function of a transmission channel. At least a radiocommunication device communicates through the channel with a remote station, the latter regularly delivering to the radiocommunication device a reference pattern. The structure of the reference pattern is variable, depending on at least one characteristic of the transmission channel.

42 Claims, 4 Drawing Sheets

OTHER PUBLICATIONS

Frederik Tufvesson and Torleiv Maseng, "Pilot Assisted Channel Estimation for OFDM in Mobile Cellular Systems" Department of Applied Electronics, Lund University, Lund, Sweden, 1997 IEEE.*

"A flexible spread-spectrum multi-carrier multiple-access system for multi-media applications", IEEE Sep. 1997, pp. 100-104.

"Degradation of Multicarrier and Single Carrier Transmission with Frequency Domain Equalization due to Pilot-Aided Channel Estimation and Frequency Synchronization", A. Czylwik et al., IEEE Nov. 1997, pp. 27-31.

* cited by examiner

METHOD FOR EXTRACTING A VARIABLE REFERENCE PATTERN

CROSS-REFERENCE TO RELATED APPLICATION

This Application is a Section 371 National Stage Application of International Application No. PCT/FR02/00486, filed Feb. 7, 2002, and published as WO 02/065685 on Aug. 22, 2002, not in English.

FIELD OF INVENTION

This invention relates to the field of digital data transmission. More precisely, the invention relates to an estimate of the transfer function of a transmission channel, and maintaining synchronisation of a radio communication device using this channel to exchange digital data with a remote station.

BACKGROUND OF THE INVENTION

In conventional digital communication systems, a sequence of reference symbols called reference symbols or pilot symbols, known to the receiver, is frequently used in the data stream sent by the transmitter. These reference symbols enable a receiver to suitably estimate the transmission channel and thus guarantee that received signals are suitably demodulated.

For communication systems involving transmission channels variable with time, it has been envisaged to distribute reference symbols in different positions within an exchanged data stream.

In these various communication systems, the structure and characteristics of reference symbols of a radio communication device are determined as a function of the worst propagation case. This type of constraint is essential in order to make a correct channel estimate, regardless of propagation conditions.

When the initial synchronisation phase is complete, a dedicated resource will be allocated to the radio communication terminal, and it will then implement a synchronisation holding phase if necessary, and make an estimate of the transmission channel.

According to this prior art technique, the reference structure is chosen so as to enable a correct channel estimate in all cases, and even in the worst communication case, in other words for a maximum multipath level and the maximum speed of the communication terminal considered.

In other words, the reference structure is sized to be adapted to the worst Doppler case and the worst delay spread.

A disadvantage of sizing the reference structure for the worst case is that it induces a statistical loss of useful transmission capacity and/or protection against errors, in cases in which the characteristics of the transmission channel are good.

The inventors have detected and analysed this problem. They have deduced that a disadvantage of this technique according to prior art is that the reference structure is frozen once and for all, for a given physical transmission channel.

Consequently, another disadvantage of this technique according to prior art is that the selected sequence of reference symbols does not depend on the characteristics of the transmission channel that depend partly on the environment of the communication terminal considered, and also on the displacement speed of this terminal.

Note that simply stating this problem is new and inventive to one skilled in the art, since the latest has always considered that the reference structure should be fixed and unique in order to produce a good channel estimate, since it is adapted to the worst signal propagation case.

SUMMARY OF THE INVENTION

Therefore, the purpose of the invention is to overcome these disadvantages according to prior art.

More precisely, a purpose of the invention is to optimise the useful digital data transmission flow between a radio communication device and a remote station, particularly but not exclusively in a multi-carrier system.

Another purpose of the invention is to implement a communication system, and particularly a radio communication system, with a high spectral efficiency.

Another purpose of the invention is to supply a communication system for creating a good compromise between the quality and transmission speed of digital data.

Another purpose of the invention is to implement a radio communication system for limiting useful transmission capacity losses when the characteristics of the channel are good.

Another purpose of the invention is to enable a good estimate of the transfer function of a channel, even when the transmission channel considered is disturbed.

A secondary purpose of the invention is to supply a technique for reducing envelope fluctuations of the transmitted signal.

These objectives and others that will appear later, are achieved using a method for extraction of a sequence of pilot symbols necessary for estimating the transfer function of a transmission channel, at least one radio communication device communicating through the said channel with a remote station, this station regularly outputting a reference pattern to the said radio communication device.

According to the invention, the structure for such a reference pattern is variable, as a function of at least one characteristic of the transmission channel.

Thus, the invention is based on a completely new and inventive approach to estimating the transfer function of a transmission channel. The invention is based particularly on the use of an adaptive reference structure, as a function of one or several characteristics of the transmission channel. Therefore, the invention is contrary to preconceived ideas of those skilled in the art, who consider that the reference symbols used for a channel estimation must be fixed at the worst propagation case.

Advantageously, the said characteristic(s) of the transmission channel comprise the maximum Doppler frequency and/or the maximum delay spread of the channel.

These characteristics are related particularly to the displacement speed of the communication device and the environment in which it is moving.

According to one advantageous characteristic of the invention, this type of method for extraction of a sequence of pilot symbols, allowing to estimate the transfer function of a transmission channel, comprises a step to allocate at least one channel a communication, the said allocated channels being functionally identical but based on distinct waveforms in terms of synchronisation, as a function of the said transmission channel characteristics.

The most suitable reference structure which allows to make the best compromise between the channel estimating quality and the data transmission capacity is thus chosen as a function of the characteristics of the transmission channel.

Preferably, the said step to allocate a traffic channel to a communication between the said radio communication device and the said remote station includes a step to exchange data representative of the said characteristic(s) of the transmission channel.

At the time that these data are exchanged, the remote station, or any other decision making entity in the radio communication network concerned, can choose the reference structure best adapted to the communication being set up between the radio communicating device and the remote station.

Advantageously, the said exchange step also enables transmission of signalling data and/or control data for the said communication.

According to one advantageous technique of the invention, when this type of method to extract a sequence of pilot symbols, allowing to estimate the transfer function of a transmission channel, is used in a multi-carrier system, the duration of symbols forming the multi-carrier symbol is variable as a function of the said characteristic(s) of the transmission channel.

Remember that multi-carrier modulation systems are particularly attractive in the case of transmission channels affected by strong fading and multiple paths. In this type of multi-carrier communication system, a wide band channel highly selective in frequency is transformed into a large number of non-selective frequency multiplexed narrow band channels. The transmission channel estimate is made by a network of reference carriers, also called pilots. Note that a multi-carrier modulation is characterised by the density of its sub-carriers network, composed of all reference carriers and useful carriers, this density being defined by $(\tau_0 \upsilon_0)^{-1}$, where $\tau_0$ corresponds to the symbol time, and $\upsilon_0$ corresponds to the spacing between sub-carriers. Therefore, according to the invention, the symbol time can be optimised as a function of one or several characteristics of the transmission channel.

Advantageously, the said symbol duration is chosen so that it makes the maximum Doppler frequency and the maximum delay spread approximately identical in standard units.

This type of symbol duration corresponds to the optimum symbol duration.

According to one particular embodiment, this type of method for extraction of a sequence of pilot symbols being used to estimate the transfer function of a transmission channel being applied to a system with two channels, one permanent signalling channel and one channel operating in burst mode, the said characteristics of the transmission channel are measured on the said permanent channel, the said channel in burst mode beginning directly with an optimum reference pattern.

According to one particular variant embodiment, the said permanent channel uses a CDMA (Code Division Multiple Access) modulation, and the said channel in burst mode uses a multi-carrier modulation (OFDM/IOTA).

Thus, in one particular embodiment of the invention based on the UMTS (Universal Mobile Telecommunication System) standard defined by 3GPP (Third Generation Partnership Project), the synchronisation of the mobile terminal obtained from the WCDMA (Wideband Code Division Multiple Access) type channel is used for the IOTA type channel, and it is assumed that the information characterising the transmission channel (maximum Doppler spread and maximum time spread) are known, so that the optimum reference network can be used directly from the beginning. Remember that the IOTA prototype function, for example described in patent document No. FR 2 733 869, has a fast time and frequency decay and is identical to its Fourier transform.

Synchronisation of the mobile terminal can be retrieved from the WCDMA channel since the frame structures of the two channels are assumed to be synchronous. The advantage of such a method is that the WCDMA channel implements a technique enabling a fast and simple recuperation of synchronisation, as for example described in patent document No. FR 2 777 407.

Advantageously, the said reference pattern structure can be modified during communication, when the said characteristics of the transmission channel vary.

Therefore, this reference pattern structure does not vary during the duration of a block, but it can vary from one block to another.

According to another advantageous characteristic of the invention, the said reference pattern structure is modified using an "intra handover" type procedure used in cellular networks.

Remember that the term "handover" in a cellular radio communication system using mobile phones denotes switching of transmission means used by a communication without interrupting the communication. Thus, by using such a procedure, the channel type can be modified in real time during a communication between the radio communication device and the remote station.

Preferably, the said reference pattern is built so as to limit envelope fluctuations of the transmitted signal.

In the case of a multi-carrier modulation system, the energy asymmetry between reference carriers and useful carriers can cause large fluctuations to the average power profile of the transmitted signal. Remember that such an energy asymmetry is the result of the fact that symbols transmitted on reference carriers have a much higher energy than useful symbols, to enable a better estimate of the transmission channel. Therefore, it is particularly advantageous to make the geometry of the pilots network vary as a function of the constraint on reduction of signal envelope fluctuations, so as to limit degradations due to non-linearity of power amplifiers used when the signal is transmitted.

Advantageously, the said reference pattern is formed from pilots, with a value and location in the time-frequency space that are known to the said device and are uniformly distributed in the said time-frequency space.

According to one advantageous technique according to the invention, the said pilots define a parallelogram in the time-frequency space.

In a multi-carrier modulation system, the use of a pilots network defining a parallelogram in the time-frequency space is a means of limiting space and/or frequency fluctuations of the transmitted power.

Advantageously, a transmission by blocks is used for transmitting at least some of the data between the said device and the said remote station.

According to one advantageous variant of the invention, such a method comprises a step to keep synchronisation of the said device with the said remote station, implementing a comparison of the energy associated with the said pilots and the energy associated with the said informative carrier frequencies of the transmitted signal.

This type of technique is implemented when the reference symbols network is rectangular.

According to one particular embodiment of the invention, this type of method for extraction of a sequence of pilot symbols providing a means of estimating the transfer function for a transmission channel comprises a step to adapt the duration of the said blocks as a function of the said characteristics of the transmission channel, such that the said channel respects a stationarity criterion during the said period.

This type of adaptation of the duration of blocks as a function of the channel characteristics means particularly that the initial synchronisation, for example acquired through a WCDMA type channel, remains valid throughout the duration of a block.

During a transmission by blocks, it is possible that the duration of a block is too long for the channel to be considered quasi-stationary for the entire block, and therefore to synchronize the receiver satisfactorily and to make a good channel estimate on the entire block. Therefore, the size of the transmitted blocks could be adapted so that the channel satisfies a stationarity criterion for the duration of a block. This can be achieved by segmenting blocks into sub-blocks, or modifying the size of blocks, if possible depending on the frequency resource. This type of modification to block sizes may consist in particular of increasing the size of the block in frequency, and reducing the block duration, so as to obtain a shorter block but without reducing the quantity of information transmitted by the block.

According to one advantageous embodiment, the said structure of the reference pattern is variable as a function of the said duration of a block.

It would be possible to determine an adapted reference pattern structure for each transmitted block. Remember that this type of reference structure does not vary during the duration of a block, but it can vary from one block to another.

Preferably, the said blocks form parallelograms in the time-frequency space, in which at least one edge and/or at least one corner is identified by one of the said pilots.

Advantageously, the edges of the said parallelograms are fully defined by the pilots.

According to one advantageous characteristic of the invention, such a method for extraction of a sequence of pilot signals to estimate the transfer function of a transmission channel also comprises a step for adaptation of the time and/or frequency density of the said pilots as a function of the said characteristic(s) of the transmission channel.

The invention also relates to a radio communication signal exchanged between a remote station and a radio communication device, comprising a reference pattern with a variable structure as a function of at least one characteristic of the transmission channel.

The invention also relates to a receiver, a base station, a transmission system, and processes for synchronisation, transmission and reception of a radio communication signal like that described above.

BRIEF DESCRIPTION OF THE DRAWINGS

Other characteristics and advantages of the invention will become clearer after reading the following description of a preferred embodiment, given as an illustrative but non-limitative example, and the appended drawings, wherein.

DETAILED DESCRIPTION OF THE PREFERRED EMBODIMENTS

The general principle of the invention is based on the adaptability of the reference structure of the signal exchanged between a radio communication device and a remote station, as a function of the characteristics of the transmission channel.

Figure 1:
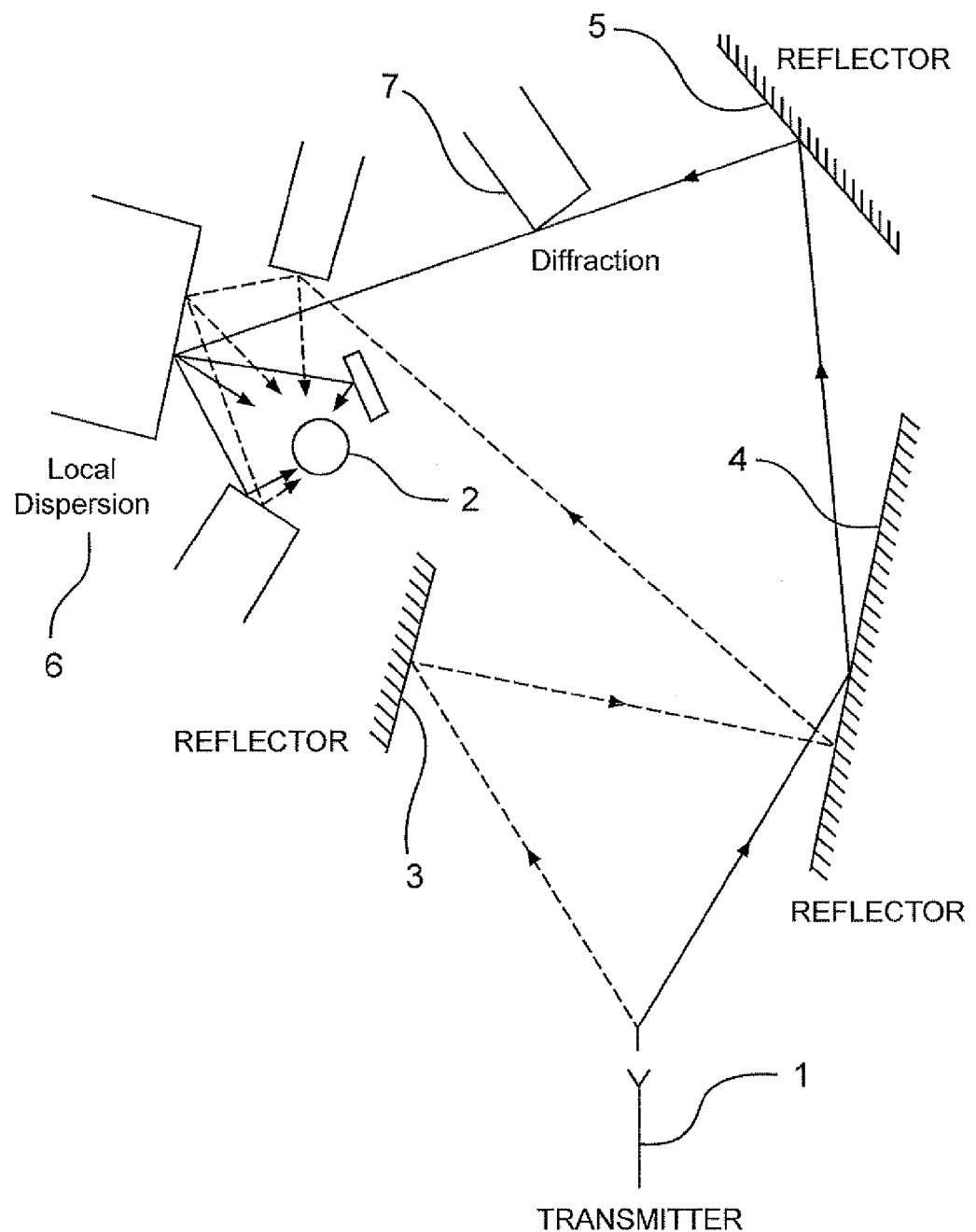
FIG. 1 illustrates an example transmission of multipath data between a fixed transmitter and a moving radio communication terminal.
Figure 2:
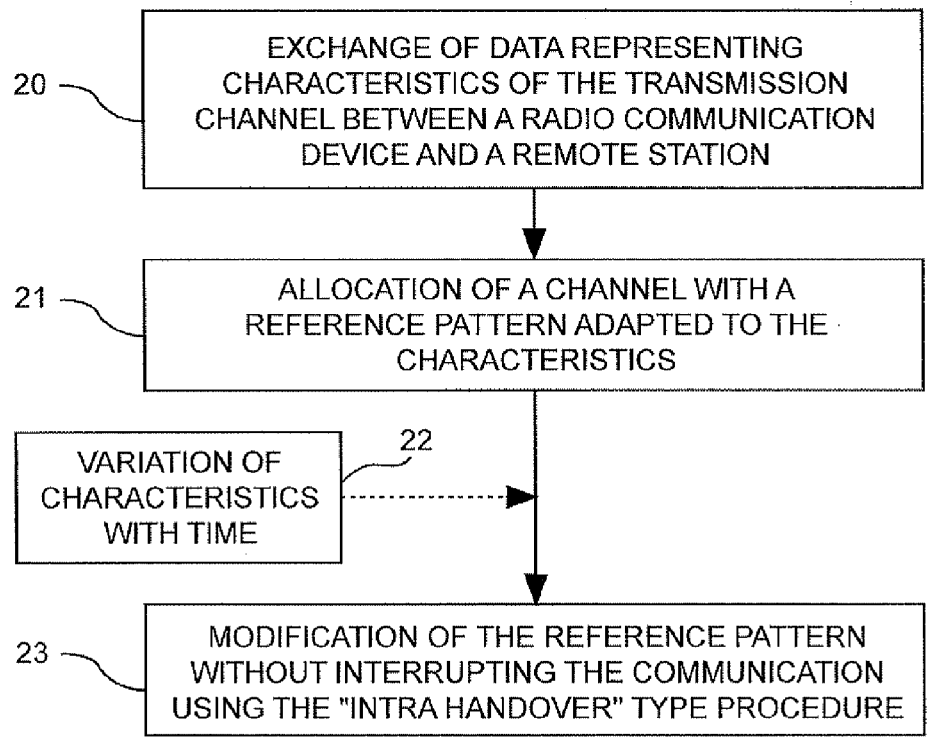
FIG. 2 shows a block diagram of the steps used to allocate a reference pattern to a communication of the type illustrated in FIG. 1.

We will present an example transmission of multipath data between a fixed transmitter and a moving radio communication terminal, and the mechanism for allocation of a reference structure adapted to such a transmission, with reference to FIGS. 1 and 2.

A transmitter 1 transmits digital data to a mobile radio communication terminal 2. For example, such a terminal 2 may be installed in the moving vehicle belonging to a user. The signal transmitted by station 1 may follow different paths before reaching the terminal 2. In particular, it is subjected to several reflections on reflectors 3, 4 and 5. It may also be diffracted by an obstacle 7, and locally dispersed in area 6 close to terminal 2. Therefore, the mobile terminal 2 receives several identical signals transmitted by the fixed station 1, but offset at different times as a function of the path followed to reach the mobile terminal 2.

The transmission channel set up between the transmitter 1 and the terminal 2 is characterised particularly by the maximum "delay spread", in other words the maximum spread in the propagation time associated with the longest paths shown in FIG. 1 between the transmitter 1 and the terminal 2.

The transmission channel is also characterised by the maximum Doppler frequency associated with the speed of the terminal 2.

As illustrated in FIG. 2, these characteristics of the transmission channel (maximum Doppler and maximum delay spread) are exchanged in the form of a message during a step reference 20 between the radio communication device 2 and the remote station 1.

Depending on the exchanged information, the station 1 in the radio communication network considered decides to allocate a frequency channel to the communication between the device 2 and the station 1, with a reference pattern adapted to the characteristics of the transmission channel. The various frequency channels that can be allocated are functionally identical, but have different wave shapes in terms of the distribution of reference symbols. Thus, as the transmission channel characteristics improve (in other words as the transmission environment becomes better), the communication system will consume less of the channel capacity for the purposes of estimating the transmission channel transfer function and possibly for maintaining synchronisation, and the transmission capacity and/or the error protection capacity can be improved correspondingly.

It is possible that the characteristics of the transmission channel vary (22) with time, due to the movement of the terminal 2 within its environment, or for example due to a change in its movement speed.

The station 1 can then cooperate with device 2 to modify the reference structure involved, during a step reference 23. This type of reference structure does not vary during the duration of a block, but it can vary from one block to another. For example, this type of modification can be made in real time using an "intra handover" type procedure. Remember that in a radio communication cellular system with mobiles, the term "handover" denotes switching of transmission means used by a communication without interrupting the communication.

In the case of a transmission by blocks, it would also be possible to consider implementing segmentation of blocks into several sub-blocks, such that the transmission channel can be considered as being quasi-stationary during the duration of a sub-block. Thus, if the duration of a block is too long for the initial synchronisation, for example acquired through the WCDMA channel, to be considered as being valid throughout the duration of a block, it would be possible to segment the block into sub-blocks for which the reference patterns are generally different. The reference pattern to be associated with each of the sub-blocks transmitted successively is then determined so as to make a good channel estimate. More generally, the block size may be adapted using any appropriate method, taking account particularly of channel stationarity.

It would also be possible to consider using a synchronisation tracking mechanism between station 1 and device 2, particularly by using asymmetry of energy between useful sub-carriers and reference sub-carriers.

Figure 3:
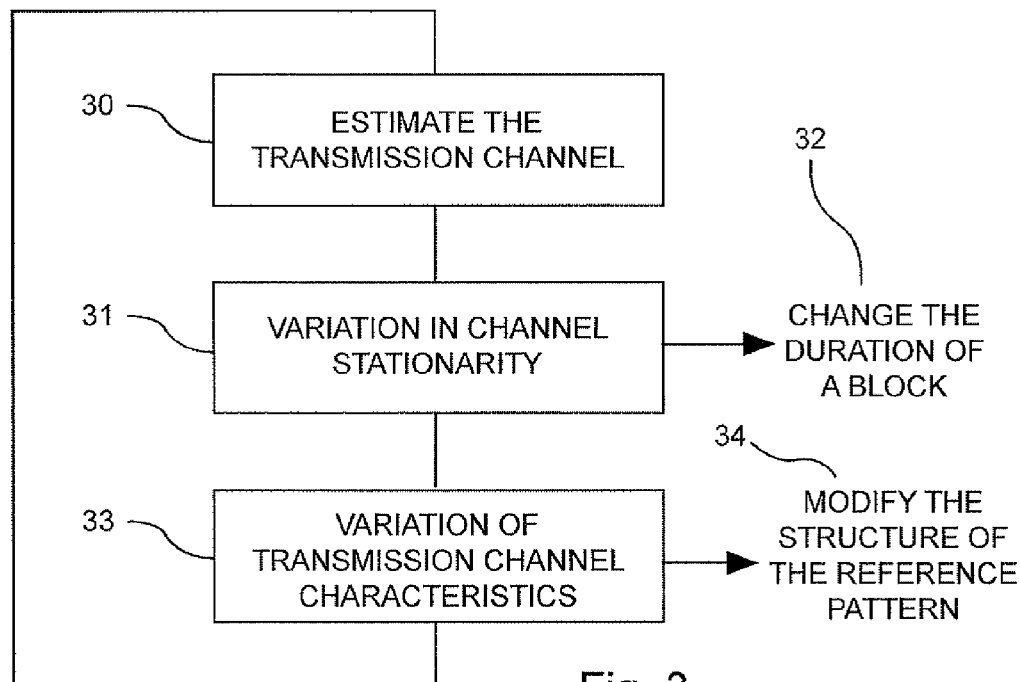
FIG. 3 illustrates the steps used during a data transmission by blocks, to adapt the duration of a block and the reference pattern associated with it as a function of the characteristics of the transmission channel.

As illustrated in FIG. 3, a channel estimating step 30 is implemented to determine transmission characteristics. If there is any change 31 to the maximum duration during which the transmission channel can be considered as being quasi-stationary, it would be possible to envisage modifying 32 the duration of the transmitted data blocks, such that the initial synchronization acquired using the WCDMA type channel remains valid for the entire duration of a block.

Depending on the variation 33 of the characteristics of the transmission channel (for example as a function of a change in the environment of a communication), the next step (34) is to determine the structure of the reference pattern adapted to each data block.

Figure 4:
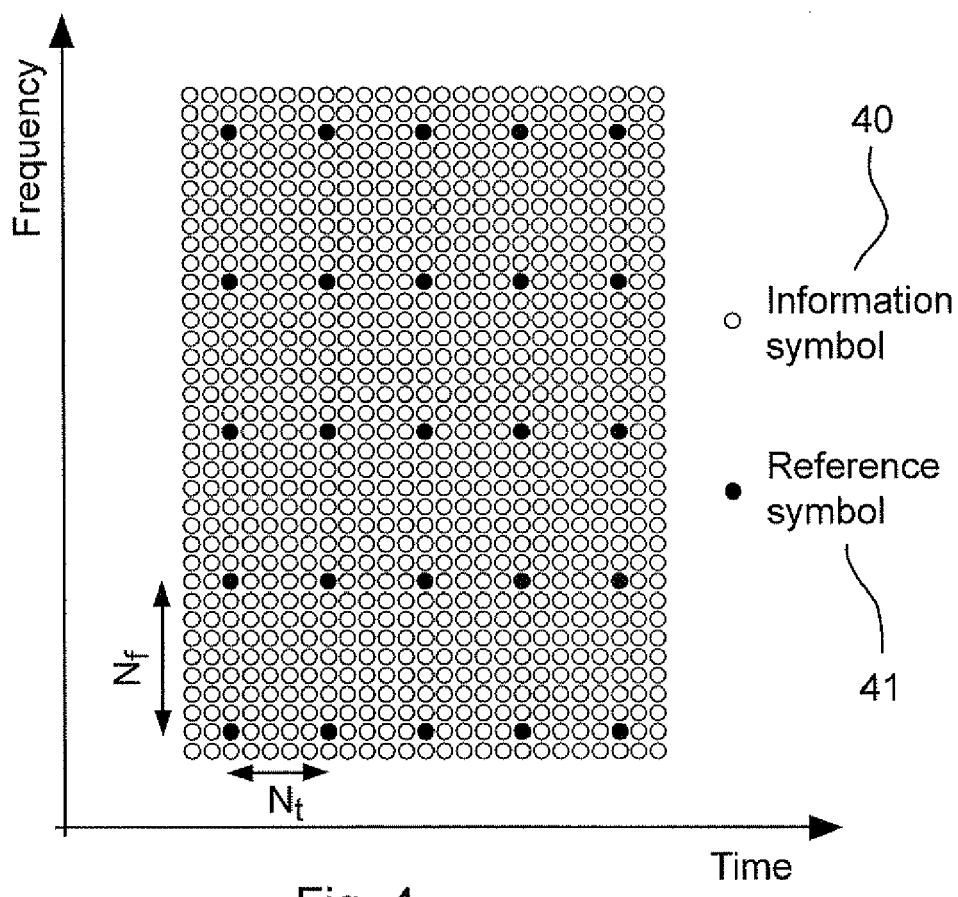
FIG. 4 shows an example of the reference pattern adapted to the "worst case" of the transmission channel illustrated in FIG. 1, in the case of a multi-carrier modulation.
Figure 5:
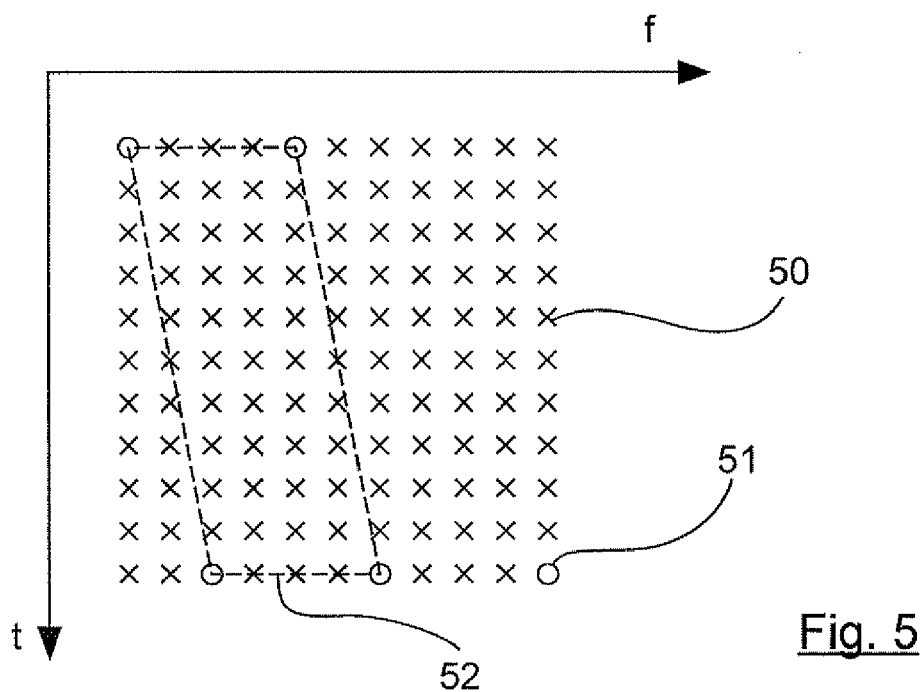
FIG. 5 illustrates an example of a reference pattern of a multi-carrier communication system in which the pilots form parallelograms in the time-frequency space.

We will now describe an example embodiment of the method for extraction of a sequence of pilot symbols to estimate the transfer function of the transmission channel according to the invention, with reference to FIGS. 3 to 5, within the framework of a transmission system using an OFDM/OQAM/IOTA type modulation. Obviously, the invention is equally applicable to any other data transmission system in which a channel estimate is necessary, and particularly transmission systems using a mono-carrier type modulation.

In particular, the invention can be used as part of a transmission system described in French patent No. FR 2 777 407 deposited by the same applicant as this patent, and related to a "Cellular radio telephony signal with a supplementary channel assigned to the down direction, and the corresponding method, system, mobile and base station".

Remember that multi-carrier systems are particularly attractive for transmissions affected by fading and multiple paths, particularly when they are associated with an error correction code and interlacing.

One main characteristic of an OFDM modulation is the density of the carrier network, which is equal to 2 for OFDM/OQAM ("Orthogonal Frequency Division Multiplex/Offset Quadrature Amplitude Modulation") type modulations like IOTA. Remember also that the density of the carriers network is defined by $(\tau_0 \upsilon_0)^{-1}$, where $\tau_0$ denotes the symbol time and $\upsilon_0$ denotes the spacing between sub-carriers.

For a channel characterised by Doppler frequency and delay spread parameters, the effects of the transmission channel on the transmitted signal are symmetric. Degradations related to Doppler spreading and the delay spread are both equivalent to a convolution and filtering in direct space, and therefore a multiplication or attenuation in reciprocal space. Furthermore, the IOTA prototype function has perfect time-frequency symmetry for standardised variables $\tau_0 = 1/\sqrt{2}$ and $\upsilon_0 = 1/\sqrt{2}$.

Since the transmission channel and the prototype function are symmetrical, a base signal identified in time and frequency can be used with the same time-frequency scale as the channel. Therefore, the maximum Doppler and the maximum delay spread are made identical, in standard units, by optimising the symbol duration.

This condition ensures that none of the time and frequency dimensions is given priority during the transmission, so that the transmitted signal is corrupted as little as possible.

I.1 Pilots Network Structure

Let $N_t$ be the spacing in time between two pilots and $N_f$ the spacing in frequency. The $(\tau_0, \upsilon_0, N_t, N_f)$ parameter set defines a physical channel. Therefore, a propagation channel corresponds to a unique physical channel.

Insertion of pilots as a function of propagation channel parameters is managed dynamically. According to one particular embodiment described in the remainder of this document, the transmitted block is bounded by a guard interval in order to reduce interference between adjacent transmitted blocks and to take account of the amplifier rise time.

Reference symbols are distributed uniformly on the channel estimating window to characterise and give a best estimate of significant channel variations. These symbols are separated from each other as much as possible to draw the maximum information from them while maximising the useful throughput.

I.2 Adaptation of the Reference Carriers Network and the Symbol Time

I.2.1 Adaptation of the Symbol Time

We will consider a particular embodiment of the invention based on the UMTS standard defined by 3GPP. We will use the synchronisation obtained from the WCDMA type channel, and we will assume that information about the type of propagation channel has been acquired. We will then change over to a channel using an OFDM/IOTA modulation. We will use information about the maximum Doppler and the maximum delay for each propagation channel type considering that the network density is fixed at 2 (1), to determine the symbol time and the spacing between sub-carriers such that the ratio of the supports of filters modelling the channel is proportional to the ratio $\tau_0$ and $\upsilon_0$ (2):

$$\tau_0 \upsilon_0 = \frac{1}{2} \quad (1)$$

$$\frac{\tau_0}{\upsilon_0} = \frac{T_{max}}{2f_D} \quad (2)$$

The symbol time must then respect the system frame structure (3):

$$\frac{T_{slot}}{\tau_0} = p, p\ integer \quad (3)$$

where $T_{slot}$ is the duration of a slot.

The different values of $\tau_0$ and $\upsilon_0$ derived from the analysis of UMTS type channels specified by the ETSI (for example refer to document TR 101 112 V3.2.0, Appendix B.1) are given in the following table:

Useful symbol time and spacing between sub-carriers for different specified propagation environments (10 ms frame)

| Environment (v in km/h) | $\tau_0$ (µs) | $\upsilon_0$ (kHz) | No. chip/$\tau_0$ | No. symb/slot | No. symb/frame |
|---|---|---|---|---|---|
| Indoor A (3) | 133.33 | 3.75 | 512 | 5 | 75 |
| Indoor B (3, 10) | | | | | |
| Out-in A (3) | | | | | |
| Out-in B (3, 50) | | | | | |
| Vehicular B (50, 120, 250) | | | | | |
| Indoor A (10) | 66.67 | 7.5 | 256 | 10 | 150 |
| Out-in B (120) | | | | | |
| Vehicular A (50, 120 | | | | | |
| Vehicular B (500) | | | | | |
| Out-in A (50) | 33.33 | 15 | 128 | 20 | 300 |
| Vehicular A (250, 500) | | | | | |
| Out-in A (120) | 16.67 | 30 | 64 | 40 | 600 |

Remember that this type of adaptation of the symbol time is not envisaged in this form for a transmission system based on a conventional OFDM modulation.

I.2.2 Determination of the Pilots Distribution

Determination of Nt:

Let Nt be the pilot sampling step according to the time dimension.

According to the sampling theorem (called Shannon's theorem), the pilot sampling period according to the time dimension $N_t\tau_0$ must satisfy:

$$N_t\tau_0 \le \frac{1}{B_D}$$

where $B_D$ is the Doppler frequency band $[-F_D, +F_D]$ and $F_D$ is the maximum Doppler frequency and $B_D = 2 *F_D$.

Determination of $N_f$:

Let $N_f$ be the pilot sampling step according to the frequency dimension.

The pilot sampling period according to the frequency dimension, $N_f\upsilon_0$, must satisfy:

$$N_f\upsilon_0 \le \frac{1}{T_{max}} \quad (4)$$

where $T_{max}$ is the maximum delay spread.

Therefore, we determine the parameters $N_t$ and $N_f$ and the distribution of pilots within the carriers network resulting from these parameters, such that the two equations defined above are satisfied.

I.2.3 Determination of the Size of the Estimating Window

It is considered that the transmission system presented in this particular embodiment shares a high speed transmission resource between several users. In particular, we consider a transmission system using a packet transmission. Therefore, this type of system enables transmission of arbitrary sized packets for a given frequency band. In particular, this diversity in the size of transmitted blocks leads to the use of small estimating windows, fixing a minimum size of the data block.

FIG. 4 illustrates a distribution of pilots in the estimating window. The reference symbols 41 are distributed uniformly within the carriers network 40, respecting a time space $N_t$ and a frequency space $N_f$.

A parallelogram-shaped distribution of pilots in the estimating window could also be considered, as illustrated in FIG. 5.

The energy asymmetry between reference carriers and useful carriers can cause large fluctuations of the average power profile of the transmitted signal. Therefore, the geometry of the pilots network may depend on the constraint to reduce signal envelope fluctuations, in order to limit degradations due to non-linearities of power amplifiers used during the transmission.

FIG. 5 thus shows an example of the information symbols network 50 in the time-frequency space, in which reference symbols 51 are uniformly distributed so as to form a parallelogram-shaped pattern 52.

I.3 Principle of a Transmitter

Figure 6:
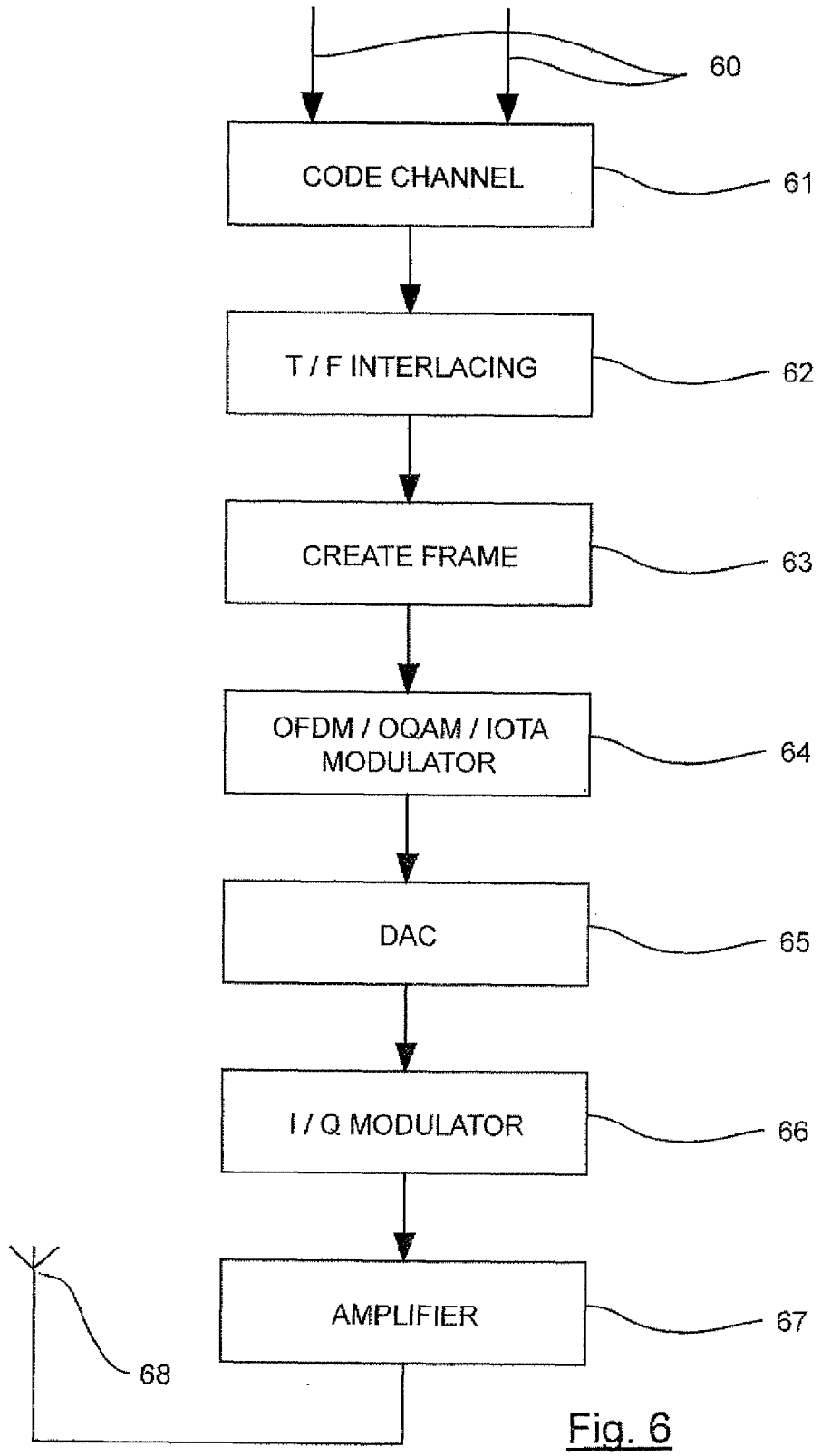
FIG. 6 shows a simplified block diagram of a transmitter according to the invention.

FIG. 6 shows a simplified block diagram of a signal transmitter according to the invention.

We will consider a high speed binary source 60. A binary source denotes a series of data corresponding to one or several source sampled digital or analog signals of any type (sound, image, data). These binary data are subjected to a binary-to-binary channel coding 61 adapted to channels with fading. For example, a trellis code could be used, possibly concatenated together with a Reed-Solomon code (the convolution code then acting as the internal code), or Turbo Codes could be used.

Finally, these data are distributed (62) in the time-frequency space to provide the necessary diversity and to decorrelate Rayleigh fading affecting the transmitted symbols.

More generally, a first binary-to-binary coding is done, together with time and frequency interlacing and binary coding with factors (mapping).

After this coding operation, real symbols to be transmitted $a_{m,n}$ are available, and they are subsequently modulated using the OFDM/OQAM/IOTA modulator 64.

The framing block 63 inserts pilots in the carriers network. The pilot insertion pattern (number of pilots in time and frequency, spacing between the pilots) depends on the channel characteristics and the transmitted block size, that are parameters known to the receiver.

The complex signal generated at the output from the modulator 64 is then converted (65) in analog form, and then transposed to the final frequency by a modulator (66) with two channels in quadrature (I and Q) and is finally amplified (67) before being sent (68).

I.4 Principle of a Receiver

A signal receiver according to the invention has a structure similar to the structure of conventional receivers, in particular comprising means of detecting an overshoot of the correlation threshold between received samples and samples from a sequence known to the receiver, used for synchronisation, and means of estimating the transmission channel transfer function.

According to the invention, this type of receiver also comprises means of adapting to a variable structure reference pattern. In particular, such a receiver can operate according to one of the modes described below:

according to a first operating mode, the receiver uses means of reception of information about the structure of the reference pattern used during a communication, through a signalling channel;

according to a second operating mode, the receiver determines the structure of the required reference pattern used during the communication, as a function of the previously measured transmission characteristics.

According to another approach, and in a first operating mode, signalling and control information (and particularly time-frequency block identification information) is sent on the WCDMA type channel. In a second operating mode, this information is changed over to the IOTA channel during the block transmission time. In all cases, synchronisation obtained from the WCDMA type channel is used, and it is assumed that maximum frequency and time spreading are known.

The invention claimed is:

1. A method for extracting a sequence of pilot symbols allowing to estimate the transfer function of a transmission channel, at least one radio communication device communicating through the channel with a remote station, the station regularly inserting a reference pattern in a signal transmitted to the radio communication device, said reference pattern having a structure in a time-frequency space defined at least by a spacing in time between two pilot symbols ($N_t$) and a spacing in frequency between two pilot symbols ($N_f$), wherein at least one feature of the structure of said reference pattern, said features comprising the value of said spacing in time between two pilot symbols ($N_t$) and/or of said spacing in frequency between two pilot symbols ($N_f$) is variable during transmission of said signal, the method comprising:

receiving said signal;

extracting a current reference pattern from said signal;

analyzing said current reference pattern, to provide at least one characteristic of the transmission channel belonging to the group consisting of a maximum Doppler frequency and a maximum delay spread of the channel; and determining features of a next reference pattern, comprising the value of said spacing in time between two pilot symbols ($N_t$) and/or of said spacing in frequency between two pilot symbols ($N_f$), as a function of said at least one characteristic of the transmission channel.

2. The method for according to claim 1, wherein the method comprises allocating at least one channel to a communication, each of the at least one allocated channel being functionally identical but based on distinct waveforms in terms of structure of the reference pattern, as a function of at least one said transmission channel characteristic.

3. The method as claimed in claim 2, wherein the step allocating a traffic channel to a communication between the radio communication device and the remote station includes exchanging data representative of said at least one characteristic of the transmission channel.

4. The method according to claim 3, wherein the exchange step also enables transmission of at least one of a group consisting of signalling data and control data for the communication.

5. The method as claimed in claim 1, wherein the transmission channel transmits a multi-carrier signal, said multi-carrier signal being composed of a sequence of symbols each formed of a plurality of carrier frequencies, wherein at least one of a time interval and frequency interval between two subsequent carrier frequencies of the multi-carrier signal is variable, as a function of said at least one characteristic of said transmission channel.

6. The method according to claim 5, wherein the time interval between two subsequent carrier frequencies is selected such that the maximum Doppler frequency and the maximum delay spread of the two subsequent carrier frequencies are made identical.

7. The method as claimed in claim 5, applied to a system with two transmission channels, comprising one permanent signalling channel and one channel operating in burst mode, wherein the at least one characteristic of the transmission channel is measured on said permanent channel, said channel operating in burst mode beginning with an optimum reference pattern.

8. The method according to claim 7, wherein said permanent channel uses a CDMA (Code Division Multiple Access) modulation, and said channel in burst mode uses a multi-carrier modulation (OFDM/IOTA).

9. The method as claimed in claim 1, comprising modifying said structure of the reference pattern by using an "intra handover" type procedure used in cellular networks.

10. The method as claimed in claim 1, comprising varying said reference pattern so as to limit the envelope fluctuations of a transmitted signal.

11. The method as claimed in claim 1, wherein said reference pattern is formed from reference carrier frequencies called pilots, for which the value and location in a time-frequency space of said reference pattern are known to said device and are uniformly distributed in said time-frequency space.

12. The method as claimed in claim 11, wherein said pilots define a parallelogram in the time-frequency space.

13. The method as claimed in claim 11, wherein a transmission of at least some of the data between said device and said remote station is made by blocks.

14. The method as claimed in claim 13, wherein the method comprises a step to keep synchronisation of said device with said remote station, implementing a comparison of energy associated with said pilots and energy associated with said carrier frequencies of the transmitted signal.

15. The method according to claim 14, wherein the method comprises a step to adapt the duration of said blocks as a function of said at least one characteristic of the transmission channel, such that said transmission channel respects a stationarity criterion during the period.

16. The method according to claim 15, wherein said structure of the reference pattern varies as a function of said duration of a block.

17. The method as claimed in claim 13, wherein said blocks form parallelograms in the time-frequency space, in which at least one of an edge and a corner is identified by one of said pilots.

18. The method according to claim 17, wherein the edges of said parallelograms are fully defined by the pilots.

19. The method as claimed in claim 12, wherein the method comprises adapting time and/or frequency density of said pilots as a function of said at least one characteristic of the transmission channel.

20. The method of claim 1, wherein the at least one radiocommunication device is synchronized with the remote station.

21. A method for extracting a sequence of pilot symbols allowing to estimate the transfer function of a transmission channel, at least one radio communication device communicating through the channel with a remote station,
the remote station regularly inserting a reference pattern in a signal transmitted to the radio communication device, said reference pattern having a structure in a time-frequency space defined at least by a spacing in time between two pilot symbols ($N_t$) and a spacing in frequency between two pilot symbols ($N_f$),
the method comprising:
receiving said signal;
extracting a culTent reference pattern from said signal;
analyzing said current reference pattern, to determine at least one characteristic of the transmission channel belonging to the group consisting of a maximum Doppler frequency and a maximum delay spread of the channel; and
determining a next structure of said reference pattern having at least one next feature of a reference pattern, comprising the value of said spacing in time between two pilot symbols (Nt) and/or of said spacing in frequency between two pilot symbols (Nf), as a function of said at least one characteristic of the transmission channel;
extracting a next reference pattern having said next structure.

22. The method according to claim 21, wherein the method comprises allocating at least one channel to a communication, each of the at least one allocated channel being functionally identical but based on distinct waveforms in terms of structure of the reference pattern, as a function of at least one said transmission channel characteristic.

23. The method as claimed in claim 22, wherein the step of allocating a traffic channel to a communication between the radio communication device and the remote station includes exchanging data representative of said at least one characteristic of the transmission channel.

24. The method according to claim 23, wherein the exchange step also enables transmission of at least one of a group consisting of signalling data and control data for the communication.

25. The method as claimed in claim 21, wherein the transmission channel transmits a multi-carrier signal, said multi-carrier signal being composed of a sequence of symbols each formed of a plurality of carrier frequencies, wherein at least one of a time interval and frequency interval between two subsequent carrier frequencies of the multi-carrier signal is variable, as a function of said at least one characteristic of said transmission channel.

26. The method according to claim 25, wherein the time interval between two subsequent carrier frequencies is selected such that the maximum Doppler frequency and the maximum delay spread of the two subsequent carrier frequencies are made identical.

27. The method as claimed in claim 25, applied to a system with two transmission channels, comprising one permanent signalling channel and one channel operating in burst mode, wherein the at least one characteristic of the transmission channel is measured on said permanent channel, said channel operating in burst mode beginning with an optimum reference pattern.

28. The method according to claim 27, wherein said permanent channel uses a CDMA (Code Division Multiple Access) modulation, and said channel in burst mode uses a multi-carrier modulation (OFDM/IOTA).

29. The method as claimed in claim 21, comprising modifying said structure of the reference pattern by using an "intra handover" type procedure used in cellular networks.

30. The method as claimed in claim 21, comprising varying said reference pattern so as to limit the envelope fluctuations of a transmitted signal.

31. The method as claimed in claim 21, wherein said reference pattern is formed from reference carrier frequencies called pilots, for which the value and location in a time-frequency space of said reference pattern are known to said device and are uniformly distributed in said time-frequency space.

32. The method as claimed in claim 31, wherein said pilots define a parallelogram in the time-frequency space.

33. The method as claimed in claim 31, wherein a transmission of at least some of the data between said device and said remote station is made by blocks.

34. The method as claimed in claim 33, wherein the method comprises a step to keep synchronisation of said device with said remote station, implementing a comparison of energy associated with said pilots and energy associated with said carrier frequencies of the transmitted signal.

35. The method according to claim 34, wherein the method comprises a step to adapt the duration of said blocks as a function of said at least one characteristic of the transmission channel, such that said transmission channel respects a stationarity criterion during the period.

36. The method according to claim 35, wherein said structure of the reference pattern varies as a function of said duration of a block.

37. The method as claimed in claim 33, wherein said blocks form parallelograms in the time-frequency space, in which at least one of an edge and a corner is identified by one of said pilots.

38. The method according to claim 37, wherein the edges of said parallelograms are fully defined by the pilots.

39. The method as claimed in claim 32, wherein the method comprises adapting time and/or frequency density of said pilots as a function of said at least one characteristic of the transmission channel.

40. The method of claim 21, wherein the at least one radiocommunication device is synchronized with the remote station.

41. A radio communication device communicating through a channel with a remote station, and receiving from said remote station a signal in which a reference pattern is regularly inserted, said reference pattern having a structure in a time-frequency space defined at least by a spacing in time between two pilot symbols ($N_t$) and a spacing in frequency between two pilot symbols ($N_f$), wherein said radio communication device comprises:
   means for receiving said signal;
   means for extracting a current reference pattern from said signal;
   means for analyzing said current reference pattern, to determine at least one characteristic of the transmission channel belonging to the group consisting of a maximum Doppler frequency and a maximum delay spread of the channel;
   means for determining a next structure of said reference pattern having at least one next feature of a reference pattern, comprising the value of said spacing in time between two pilot symbols (Nt) and/or of said spacing in frequency between two pilot symbols (Nf), as a function of said at least one characteristic of the transmission channel; and
   means for extracting a next reference pattern having said next structure.

42. A remote station communicating through a channel with at least one radio communication device, said remote station sending a signal in which a reference pattern is regularly inserted, said reference pattern having a structure in a time-frequency space defined at least by a spacing in time between two pilot symbols ($N_t$) and a spacing in frequency between two pilot symbols ($N_f$),
   wherein said remote station comprises:
      means for inserting a current reference pattern in said signal;
      means for obtaining at least one characteristic of the transmission channel belonging to the group consisting of a maximum Doppler frequency and a maximum delay spread of the channel;
      means for determining a next structure of said reference pattern having at least one next feature of a reference pattern, comprising the value of said spacing in time between two pilot symbols (Nt) and/or of said spacing in frequency between two pilot symbols (Nf), as a function of said at least one characteristic of the transmission channel; and
      means for inserting a next reference pattern having said next structure in said signal.

* * * * *

UNITED STATES PATENT AND TRADEMARK OFFICE
CERTIFICATE OF CORRECTION

| | |
|---|---|
| PATENT NO. | : 7,313,174 B2 |
| APPLICATION NO. | : 10/467571 |
| DATED | : December 25, 2007 |
| INVENTOR(S) | : Michel Alard et al. |

It is certified that error appears in the above-identified patent and that said Letters Patent is hereby corrected as shown below:

Column 13:

Line 26 delete "culTent" and add "current"

Signed and Sealed this

First Day of June, 2010

David J. Kappos
*Director of the United States Patent and Trademark Office*